US006791585B1

(12) United States Patent
Brecher et al.

(10) Patent No.: US 6,791,585 B1
(45) Date of Patent: Sep. 14, 2004

(54) COMPUTER METHOD AND SYSTEM FOR RECONCILING DISPARATE DATA ARCHIVAL MEDIUMS

(75) Inventors: Virgina Howard Brecher, West Cornwall, CT (US); Rhys F. Elliott, Somerville, MA (US); Menachem Levanoni, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/489,237

(22) Filed: Jan. 21, 2000

(51) Int. Cl.[7] .................................................. G09G 5/00
(52) U.S. Cl. ...................... 345/765; 345/769; 345/780; 707/102; 707/5; 707/6
(58) Field of Search ............................... 345/748, 765, 345/769, 780; 707/5–7, 102, 104.1

(56) References Cited

U.S. PATENT DOCUMENTS

| | | | | |
|---|---|---|---|---|
| 5,191,525 A | * | 3/1993 | LeBrun et al. .............. 707/500 |
| 5,630,131 A | * | 5/1997 | Palevich et al. ............. 717/108 |
| 5,864,848 A | * | 1/1999 | Horvitz et al. .................. 707/6 |
| 5,914,713 A | * | 6/1999 | Nario et al. ................. 345/744 |
| 6,002,865 A | * | 12/1999 | Thomsen ........................ 707/3 |
| 6,031,625 A | * | 2/2000 | Sherman et al. ........... 358/1.18 |
| 6,094,684 A | * | 7/2000 | Pallmann .................... 709/227 |
| 6,134,564 A | * | 10/2000 | Listou ......................... 707/505 |
| 6,240,422 B1 | * | 5/2001 | Atkins et al. ................ 707/102 |
| 6,341,287 B1 | * | 1/2002 | Sziklai et al. ............... 707/102 |
| 6,343,294 B1 | * | 1/2002 | Hawley ....................... 707/103 |
| 6,381,600 B1 | * | 4/2002 | Lau ............................... 707/6 |

* cited by examiner

*Primary Examiner*—John Cabeca
*Assistant Examiner*—Tadesse Hailu
(74) *Attorney, Agent, or Firm*—Stephen C. Kaufman, Esq.; McGinn & Gibb, PLLC

(57) ABSTRACT

A computer method suitable for reconciling disparate data archival mediums. The method obviates the need for writing programs that are specific or uniquely tailored to each data archival medium, wherein it is desired to extract specific fields from a variety of spreadsheet or database output files.

18 Claims, 17 Drawing Sheets

13

| Iventory.TXT—WordPad |  |  |  |  |
|---|---|---|---|---|
| INVOICE | INV. DATE | MFG | M/T-MOD | S/N |
| 253F84401 | 07/21/1998 | IBM | 654600N | 23FC563 |
| 253196301 | 02/05/1998 | IBM | 654600N | 23T2572 |
| 253196301 | 02/05/1998 | IBM | 654700N | 2366752 |
| 253196301 | 02/05/1998 | IBM | 654700N | 2366770 |
| 253H11801 | 08/18/1998 | IBM | 654700N | 2379437 |
| 253B66501 | 05/20/1998 | IBM | 654700N | 23A3909 |
| 253196601 | 02/05/1998 | IBM | 654700N | 23A5028 |
| 253196501 | 02/05/1998 | IBM | 654700N | 23A5087 |
| 253196701 | 02/05/1998 | IBM | 654700N | 23A5097 |
| 253196601 | 02/05/1998 | IBM | 654700N | 23A5098 |
| 253196501 | 02/05/1998 | IBM | 654700N | 23A5103 |
| 253196601 | 02/05/1998 | IBM | 654700N | 23A5108 |
| 253196501 | 02/05/1998 | IBM | 654700N | 23A5109 |
| 253196601 | 02/05/1998 | IBM | 654700N | 23A5111 |
| 253196501 | 02/05/1998 | IBM | 654700N | 23A5113 |
| 253196601 | 02/05/1998 | IBM | 654700N | 23A5115 |
| 253196501 | 02/05/1998 | IBM | 654700N | 23A5119 |
| 253E04501 | 06/22/1998 | IBM | 654700N | 23B6860 |
| 253G93901 | 08/04/1998 | IBM | 654700N | 23D0458 |

For Help, press F1

| INV. DATE | MFG | M/T-MOD | S/N |
|---|---|---|---|
| 7/21/1998 | IBM | 654600N | 23FC563 |
| 2/05/1998 | IBM | 654600N | 23T2572 |
| 2/05/1998 | IBM | 654700N | 2366752 |
| 2/05/1998 | IBM | 654700N | 2366770 |
| 3/18/1998 | IBM | 654700N | 2379437 |
| 5/20/1998 | IBM | 654700N | 23A3909 |
| 2/05/1998 | IBM | 654700N | 23A5028 |
| 2/05/1998 | IBM | 654700N | 23A5087 |
| 2/05/1998 | IBM | 654700N | 23A5097 |
| 2/05/1998 | IBM | 654700N | 23A5098 |
| 2/05/1998 | IBM | 654700N | 23A5103 |
| 2/05/1998 | IBM | 654700N | 23A5108 |
| 2/05/1998 | IBM | 654700N | 23A5109 |
| 2/05/1998 | IBM | 654700N | 23A5111 |
| 2/05/1998 | IBM | 654700N | 23A5113 |
| 2/05/1998 | IBM | 654700N | 23A5115 |
| 2/05/1998 | IBM | 654700N | 23A5119 |
| 5/22/1998 | IBM | 654700N | 23B6860 |
| 3/04/1998 | IBM | 654700N | 23D0458 |
| 3/06/1998 | IBM | 654700N | 23D0466 |
| 3/04/1998 | IBM | 654700N | 23D0472 |
| 3/04/1998 | IBM | 654700N | 23D0474 |
| 3/06/1998 | IBM | 654700N | 23D0478 |
| 7/07/1998 | IBM | 654700N | 23F0234 |
| 7/10/1998 | IBM | 654700N | 23F0244 |

Columns: Type | Model | Serial

Buttons: Open File | Reset | Add File | Import
Set Machine Types

About IBM | Support | Search | Feedback
Document: Done

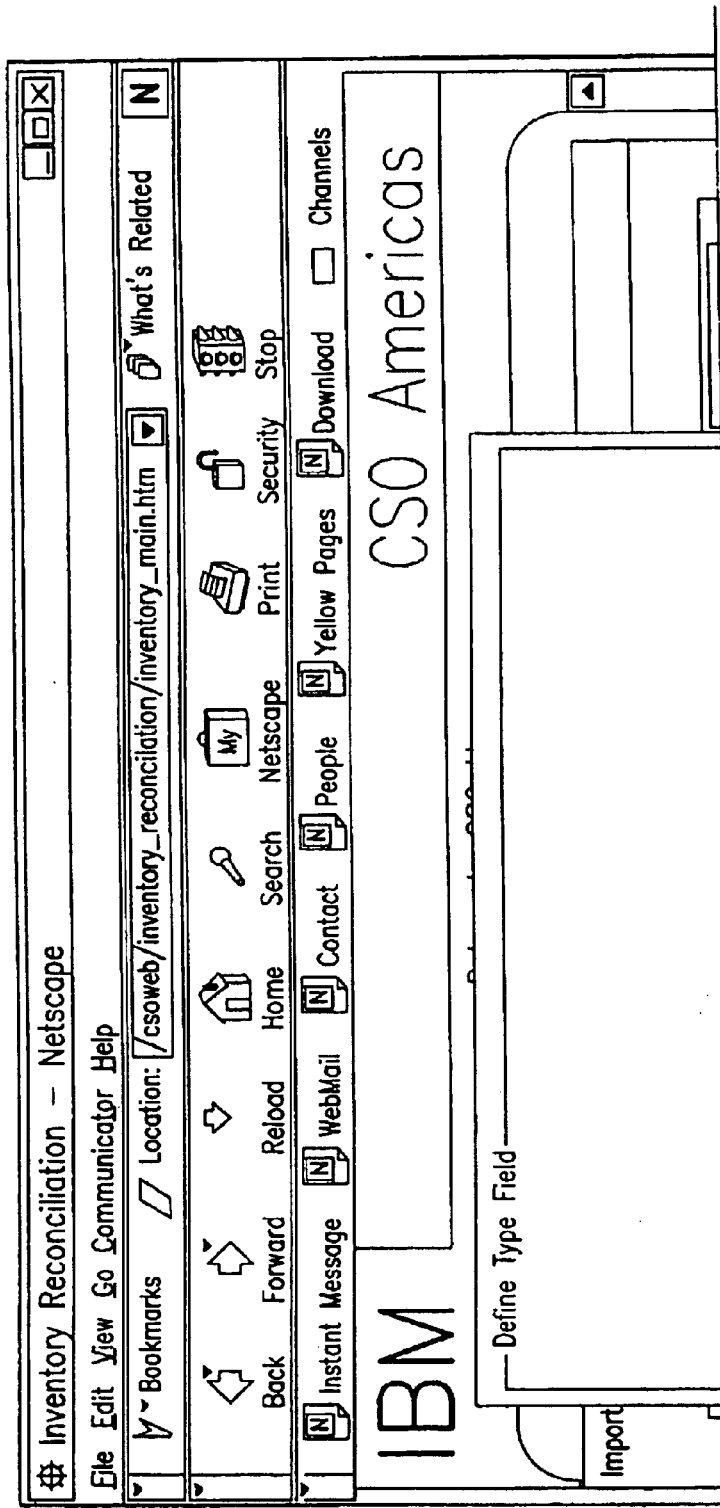

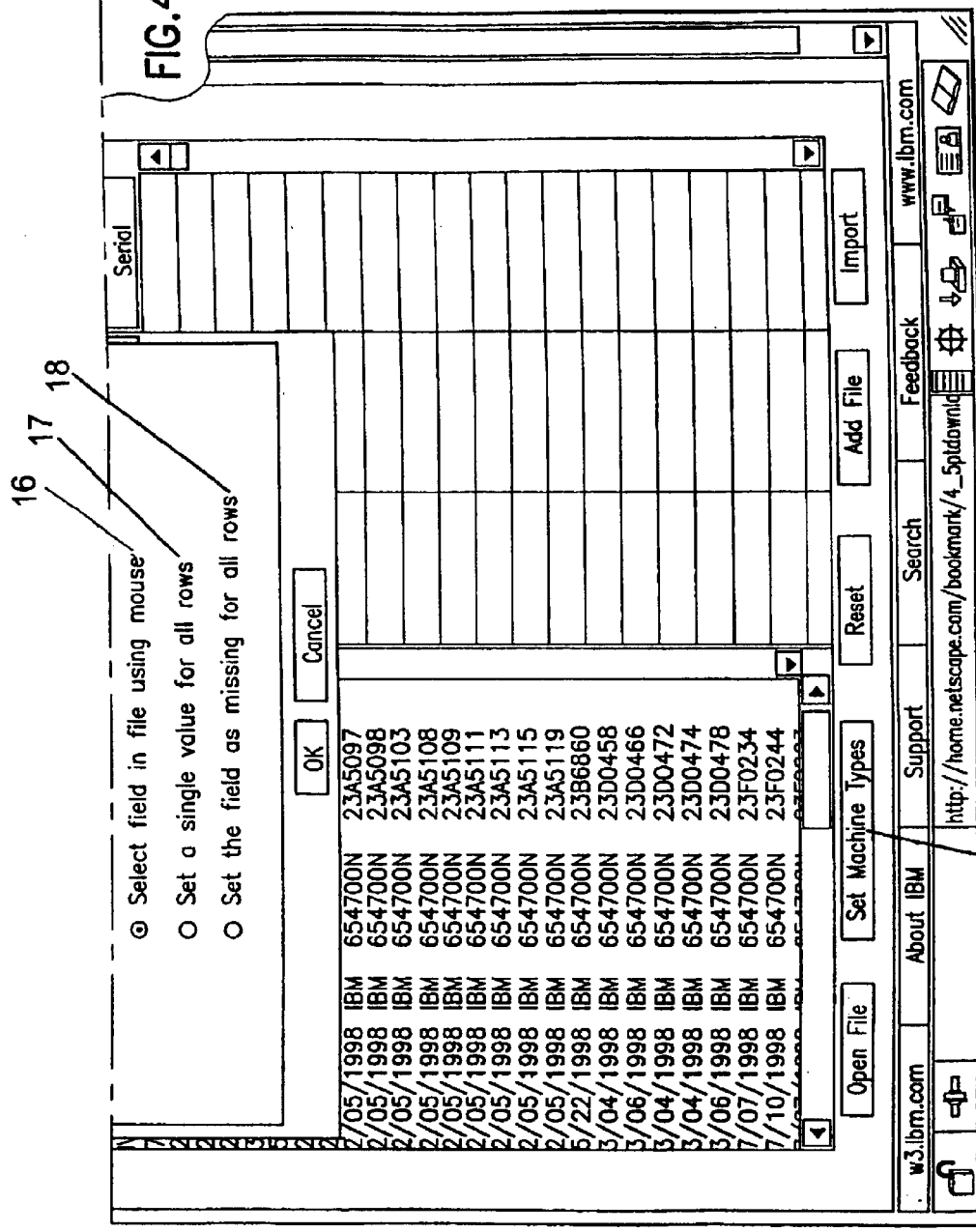

FIG. 5B

| NV. DATA | MFG | M/T-MOD | S/N |
|---|---|---|---|
| 7/21/1998 | IBM | 654600N | 23FC563 |
| 2/05/1998 | IBM | 654600N | 23T2572 |
| 2/05/1998 | IBM | 654700N | 2366752 |
| 2/05/1998 | IBM | 654700N | 2366770 |
| 5/18/1998 | IBM | 654700N | 2379437 |
| 5/20/1998 | IBM | 654700N | 23A3909 |
| 2/05/1998 | IBM | 654700N | 23A5028 |
| 2/05/1998 | IBM | 654700N | 23A5087 |
| 2/05/1998 | IBM | 654700N | 23A5097 |
| 2/05/1998 | IBM | 654700N | 23A5098 |
| 2/05/1998 | IBM | 654700N | 23A5103 |
| 2/05/1998 | IBM | 654700N | 23A5108 |
| 2/05/1998 | IBM | 654700N | 23A5109 |
| 2/05/1998 | IBM | 654700N | 23A5111 |
| 2/05/1998 | IBM | 654700N | 23A5113 |
| 2/05/1998 | IBM | 654700N | 23A5115 |
| 2/05/1998 | IBM | 654700N | 23A5119 |
| 5/22/1998 | IBM | 654700N | 23B6860 |
| 3/04/1998 | IBM | 654700N | 23D0458 |
| 3/06/1998 | IBM | 654700N | 23D0466 |
| 3/04/1998 | IBM | 654700N | 23D0472 |
| 3/04/1998 | IBM | 654700N | 23D0474 |
| 3/06/1998 | IBM | 654700N | 23D0478 |
| 7/07/1998 | IBM | 654700N | 23F0234 |
| 7/10/1998 | IBM | 654700N | 23F0244 |

| Type | Model | Serial |
|---|---|---|
| 6546 | | |
| 6546 | | |
| 6547 | | |
| 6547 | | |
| 6547 | | |
| 6547 | | |
| 6547 | | |
| 6547 | | |
| 6547 | | |
| 6547 | | |
| 6547 | | |
| 6547 | | |
| 6547 | | |
| 6547 | | |
| 6547 | | |

Open File | About IBM | Set Machine Types | Reset | Add File | Import w3.ibm.com | Support | Document: Done | Search | Feedback | www.ibm.com

FIG.6B

| Type | Model | Serial |
|---|---|---|
| 6546 | 00N | 23FC563 |
| 6546 | 00N | 23T2572 |
| 6547 | 00N | 2366752 |
| 6547 | 00N | 2366770 |
| 6547 | 00N | 2379437 |
| 6547 | 00N | 23A3909 |
| 6547 | 00N | 23A5028 |
| 6547 | 00N | 23A5087 |
| 6547 | 00N | 23A5097 |
| 6547 | 00N | 23A5098 |
| 6547 | 00N | 23A5103 |
| 6547 | 00N | 23A5108 |
| 6547 | 00N | 23A5109 |
| 6547 | 00N | 23A5111 |
| 6547 | 00N | 23A5113 |
| 6547 | 00N | 23A5115 |
| 6547 | 00N | 23A5119 |
| 6547 | 00N | 23B6860 |

| INV. DATE | MFG | M/T-MOD | S/N |
|---|---|---|---|
| 7/21/1998 | IBM | 654600N | 23FC563 |
| 2/05/1998 | IBM | 654600N | 23T2572 |
| 2/05/1998 | IBM | 654700N | 2366752 |
| 2/05/1998 | IBM | 654700N | 2366770 |
| 3/18/1998 | IBM | 654700N | 2379437 |
| 5/20/1998 | IBM | 654700N | 23A3909 |
| 2/05/1998 | IBM | 654700N | 23A5028 |
| 2/05/1998 | IBM | 654700N | 23A5087 |
| 2/05/1998 | IBM | 654700N | 23A5097 |
| 2/05/1998 | IBM | 654700N | 23A5098 |
| 2/05/1998 | IBM | 654700N | 23A5103 |
| 2/05/1998 | IBM | 654700N | 23A5108 |
| 2/05/1998 | IBM | 654700N | 23A5109 |
| 2/05/1998 | IBM | 654700N | 23A5111 |
| 2/05/1998 | IBM | 654700N | 23A5113 |
| 2/05/1998 | IBM | 654700N | 23A5115 |
| 2/05/1998 | IBM | 654700N | 23A5119 |
| 5/22/1998 | IBM | 654700N | 23B6860 |
| 3/04/1998 | IBM | 654700N | 23D0458 |
| 3/04/1998 | IBM | 654700N | 23D0466 |
| 3/04/1998 | IBM | 654700N | 23D0472 |
| 3/04/1998 | IBM | 654700N | 23D0474 |
| 3/06/1998 | IBM | 654700N | 23D0478 |
| 7/07/1998 | IBM | 654700N | 23F0234 |
| 7/10/1998 | IBM | 654700N | 23F0244 |

FIG. 8B

| INVOICE | INV. DATA | MFG | M/T | Type | Model | Serial | Invoice |
|---|---|---|---|---|---|---|---|
| 253F84401 | 7/21/1998 | IBM | 6546 | 6546 | 00N | 23FC563 | 253F844... |
| 253196301 | 2/05/1998 | IBM | 6546 | 6546 | 00N | 23T2572 | 2531963... |
| 253196301 | 2/05/1998 | IBM | 6547 | 6547 | 00N | 2366752 | 2531963... |
| 253196301 | 2/05/1998 | IBM | 6547 | 6547 | 00N | 2366770 | 2531963... |
| 253H11801 | 8/18/1998 | IBM | 6547 | 6547 | 00N | 2379437 | 253H11... |
| 253B66501 | 5/20/1998 | IBM | 6547 | 6547 | 00N | 23A3909 | 253B66... |
| 253196601 | 2/05/1998 | IBM | 6547 | 6547 | 00N | 23A5028 | 2531966... |
| 253196701 | 2/05/1998 | IBM | 6547 | 6547 | 00N | 23A5087 | 2531967... |
| 253196601 | 2/05/1998 | IBM | 6547 | 6547 | 00N | 23A5097 | 2531967... |
| 253196501 | 2/05/1998 | IBM | 6547 | 6547 | 00N | 23A5098 | 2531966... |
| 253196501 | 2/05/1998 | IBM | 6547 | 6547 | 00N | 23A5103 | 2531965... |
| 253196501 | 2/05/1998 | IBM | 6547 | 6547 | 00N | 23A5108 | 2531966... |
| 253196601 | 2/05/1998 | IBM | 6547 | 6547 | 00N | 23A5109 | 2531966... |
| 253196501 | 2/05/1998 | IBM | 6547 | 6547 | 00N | 23A5111 | 2531965... |
| 253E04501 | 6/22/1998 | IBM | 6547 | 6547 | 00N | 23A5113 | 2531966... |
| 253G93901 | 8/04/1998 | IBM | 6547 | 6547 | 00M | 23A5115 | 2531966... |
| 253G78601 | 8/06/1998 | IBM | 6547 | 6547 | 00N | 23A5119 | 2531965... |
| 253G93901 | 8/04/1998 | IBM | 6547 | 6547 | 00N | 23B6860 | 253E04... |
| 253G93901 | 8/04/1998 | IBM | | | | | |
| 253G76101 | 8/06/1998 | IBM | | | | | |
| 253E87401 | 7/07/1998 | IBM | | | | | |
| 253E90001 | 7/10/1998 | IBM | | | | | |

23

Open File | Set Machine Types | Reset | Search | Add File | Import
About IBM | Support | Feedback
w3.ibm.com | Document: Done | www.ibm.com

| Command Promp-java invrec.server.FileServer | | | |
|---|---|---|---|
| 6546 | OON | 23FC563 | 253F84401 | 07/21/1998 |
| 6546 | OON | 23T2572 | 253196301 | 02/05/1998 |
| 6547 | OON | 2366752 | 253196301 | 02/05/1998 |
| 6547 | OON | 2366770 | 253196301 | 02/05/1998 |
| 6547 | OON | 2379437 | 253H11801 | 08/18/1998 |
| 6547 | OON | 23A3909 | 253B66501 | 05/20/1998 |
| 6547 | OON | 23A5028 | 253196301 | 02/05/1998 |
| 6547 | OON | 23A5087 | 253196501 | 02/05/1998 |
| 6547 | OON | 23A5097 | 253196701 | 02/05/1998 |
| 6547 | OON | 23A5098 | 253196601 | 02/05/1998 |
| 6547 | OON | 23A5103 | 253196501 | 02/05/1998 |
| 6547 | OON | 23A5108 | 253196601 | 02/05/1998 |
| 6547 | OON | 23A5109 | 253196601 | 02/05/1998 |
| 6547 | OON | 23A5111 | 253196601 | 02/05/1998 |
| 6547 | OON | 23A5113 | 253196501 | 02/05/1998 |
| 6547 | OON | 23A5115 | 253196601 | 02/05/1998 |
| 6547 | OON | 23A5119 | 253196501 | 02/05/1998 |
| 6547 | OON | 23B6860 | 253E04501 | 06/22/1998 |
| 6547 | OON | 23D0458 | 253G93901 | 08/04/1998 |
| 6547 | OON | 23D0466 | 253G78601 | 08/06/1998 |
| 6547 | OON | 23D0472 | 253G93901 | 08/04/1998 |
| 6547 | OON | 23D0474 | 253G93901 | 06/04/1998 |
| 6547 | OON | 23D0478 | 253G76101 | 08/06/1998 |
| 6547 | OON | 23F0234 | 253E87401 | 07/07/1998 |
| 6547 | OON | 23F0244 | 253E90001 | 07/10/1998 |

COMPUTER METHOD AND SYSTEM FOR RECONCILING DISPARATE DATA ARCHIVAL MEDIUMS

BACKGROUND OF THE INVENTION

1. Field of the Invention

This invention relates to a computer method and system for reconciling disparate data archival mediums.

2. Introduction to the Invention

Data archival mediums comprising inter alia conventional spreadsheets and database tables, are known. Data archival mediums are available for purchase from sundry commercial vendors.

SUMMARY OF THE INVENTION

Our inventive work centers on a problem arising with respect to reconciling disparate data archival mediums, for example, and in particular, how to extract specific fields from a variety of spreadsheet and database output files.

Now, it is known to solve this problem, by writing programs that are individually specific and tailored to each of the disparate spreadsheet and database formats.

We have discerned, in this regard, that this type of solution, although technically available, may not be optimal. First of all, it presupposes expertise particular to each of the disparate data archival mediums. This expertise, however, cannot always be reasonably provided or assumed. Second, it is a labor intensive solution, and therefore not optimally cost efficient.

We have now discovered a novel computer method and system for reconciling disparate data archival mediums, which discoveries enable one to extract specific fields from a variety of spreadsheet and database output files, without writing programs specific or tailored to each spreadsheet and database format. Accordingly, the present invention now enables one to advantageously reconcile disparate data archive mediums, transparently, as it were, thereby obviating the problems suggested with respect to the prior art. The present invention can facilitate the ease of use of data archival mediums, and enable their greater exploitation by a greater number of users, than heretofore.

Accordingly, in a first aspect of the present invention, we disclose a computer method comprising the steps of:

(i) identifying content included in an arbitrary data archival medium;

(ii) exporting the content to a flat file;

(iii) importing the step (ii) flat file content into an auxiliary Graphical User Interface (GUI);

(iv) specifying with respect to the GUI a subset of GUI content for facilitating interrogation of the subset content; and (v) displaying the resulting subset content in an appropriate display.

Step (i) preferably comprises identifying content that correlates to at least 5% of total content; for example, 30% of total content that is included in the arbitrary data archival medium.

The data archival medium may comprise, for example, a conventional spreadsheet or a conventional database table.

Step (ii) preferably comprises exporting the content to an ASCII file.

Step (ii) may comprise exporting the content to a flat file in which components of the content are delimited by at least one of comma, blank, tab, semicolon, and $ sign.

Step (ii) preferably comprises exporting content that correlates to at least 5% of total step (i) content.

The step (iii) auxiliary GUI may operate as a common interrogating tool for disparate data archival mediums.

Step (iv) preferably contemplates specifying a subset of GUI content by using a mouse.

Step (iv) may comprise specifying a subset of GUI content by selecting a column defined by the GUI, or alternatively by specifying a range of column values.

Finally, the method may advantageously include a step (vi) comprising adding new fields to the step (iv) subset for the purpose of entering new content.

In a second aspect of the present invention, we disclose a computer system comprising:

(i) means for identifying content included in an arbitrary data archival medium;

(ii) CPU means for exporting the content to a flat file;

(iii) CPU means for importing the flat file content into an auxiliary Graphical User Interface (GUI);

(iv) CPU means for specifying with respect to the GUI a subset of GUI content for facilitating interrogation of the subset content; and (v) means for displaying the resulting subset content in an appropriate display window.

In a third aspect of the present invention, we disclose a programmable storage device comprising method steps for reconciling disparate data archival mediums, the method comprising the steps of:

(i) identifying content included in an arbitrary data archival medium;

(ii) exporting the content to a flat file;

(iii) importing the step (ii) flat file content into an auxiliary Graphical User Interface (GUI);

(iv) specifying with respect to the GUI a subset of GUI content for facilitating interrogation of the subset content; and (v) displaying the resulting subset content in an appropriate display window.

BRIEF DESCRIPTION OF THE DRAWING

The invention is illustrated in the accompanying drawing, in which:

FIGS. 1–10 provide illustrations of an Example of the present invention; and

DETAILED DESCRIPTION OF THE PRESENT INVENTION

As summarized above, the invention addresses a problem in data processing: how to extract specific fields from a variety of spreadsheet and database formats. In an Example used to illustrate the invention, the type, model, and serial number information will be extracted from a customer file to reconcile the customer's maintenance contract information with that of the maintenance service provider, in this case XYX Corp. The data is typically thousands of lines long so manual entry into a form is not feasible.

The invention requires only that the customer export the data from their spreadsheet or database preferably to an ASCII (text) file. The fields or columns in these files preferably are non-delineated, that is, they appear as they do in the original spreadsheet application with spaces separating the fields.

Figure 1:
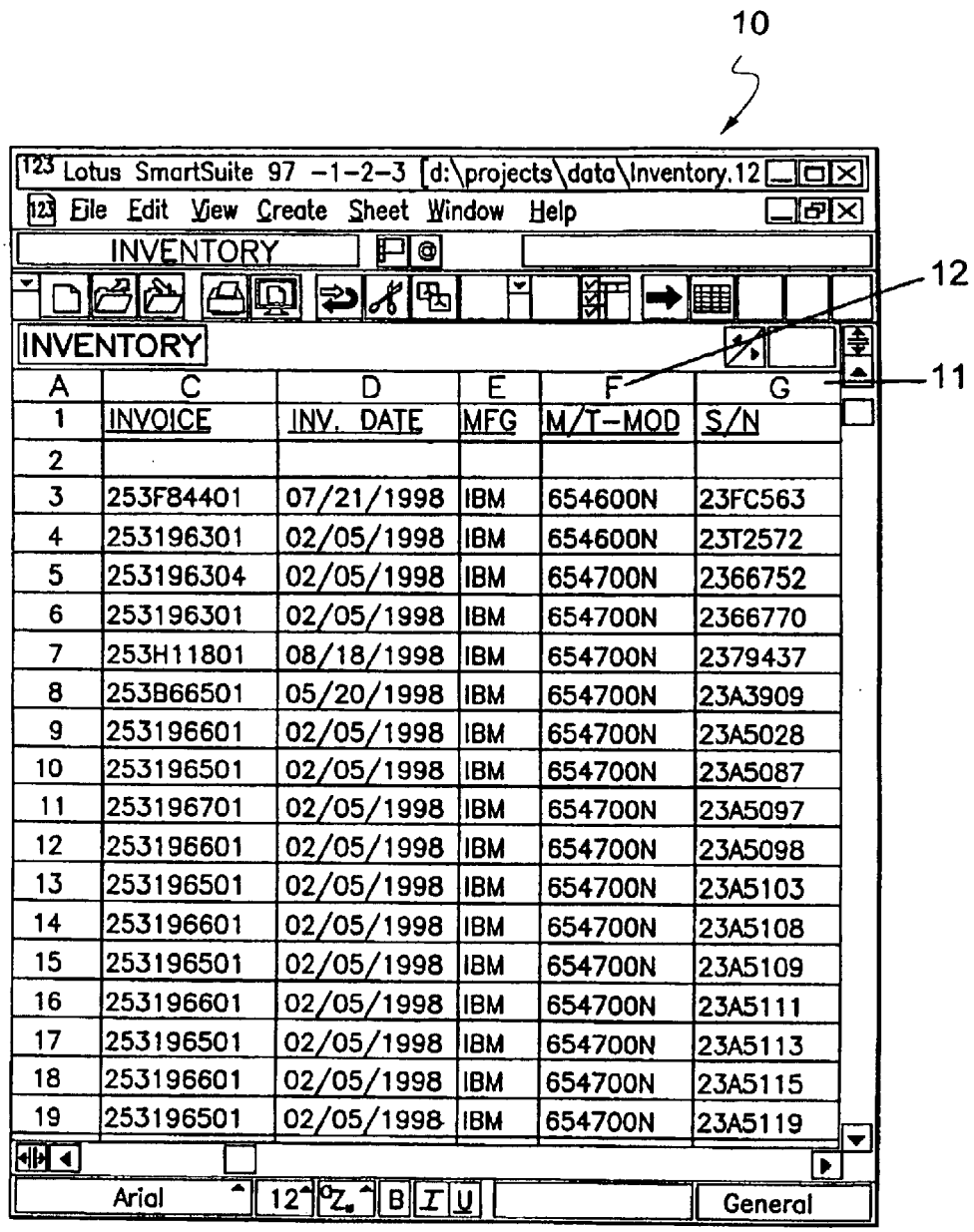

FIG. 1 shows an example of a customer maintenance inventory list maintained in a spreadsheet 10. The information of interest to the maintenance service provider is the right hand column 11, which contains the machine serial number, and the next column 12 to the left, which contains the concatenated type and model. When the data is exported to a text file, it may appear as shown in FIG. 2. In this case, most of the data is delineated by blanks, but this is not true of type and model, which are merged into one column 13. Also, most customer files may include address information and other fields which contain spaces as part of the field. It is generally difficult, if not impossible, for a program to automatically parse the fields and separate them.

The invention provides a simple Graphic User Interface (GUI) which allows the customer to define the location of the data required by the inventory reconciliation program. It also allows the user to add extra fields to the imported data. These fields are not of interest to the application, but they will show up in the application's output files, making them more readable to the end user.

Figures 3, 3A, 3B:
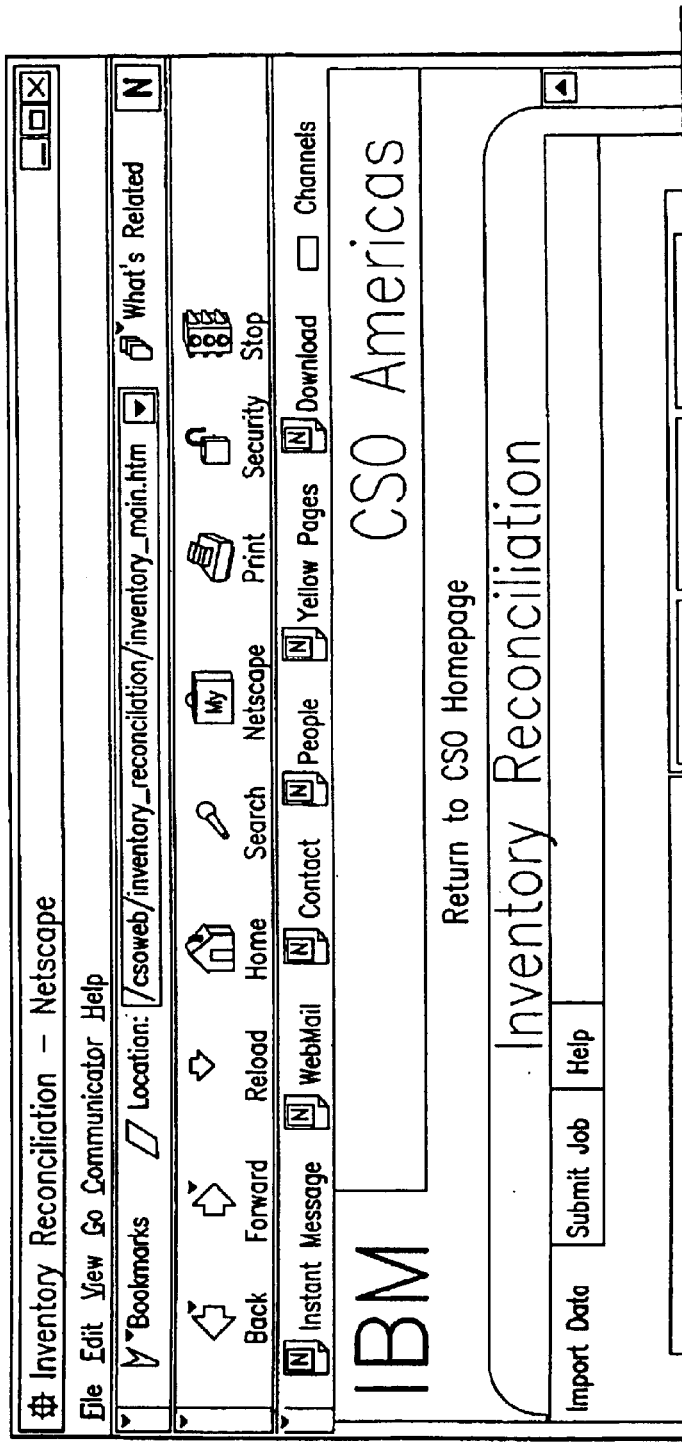

FIG. 3 shows the customer list imported into the GUI. In this example, the GUI preferably is implemented by an applet downloaded from a server into the customer's browser. Permissions have been set so that the GUI can load the customer list from the client machine.

Figures 5, 5A, 5B:
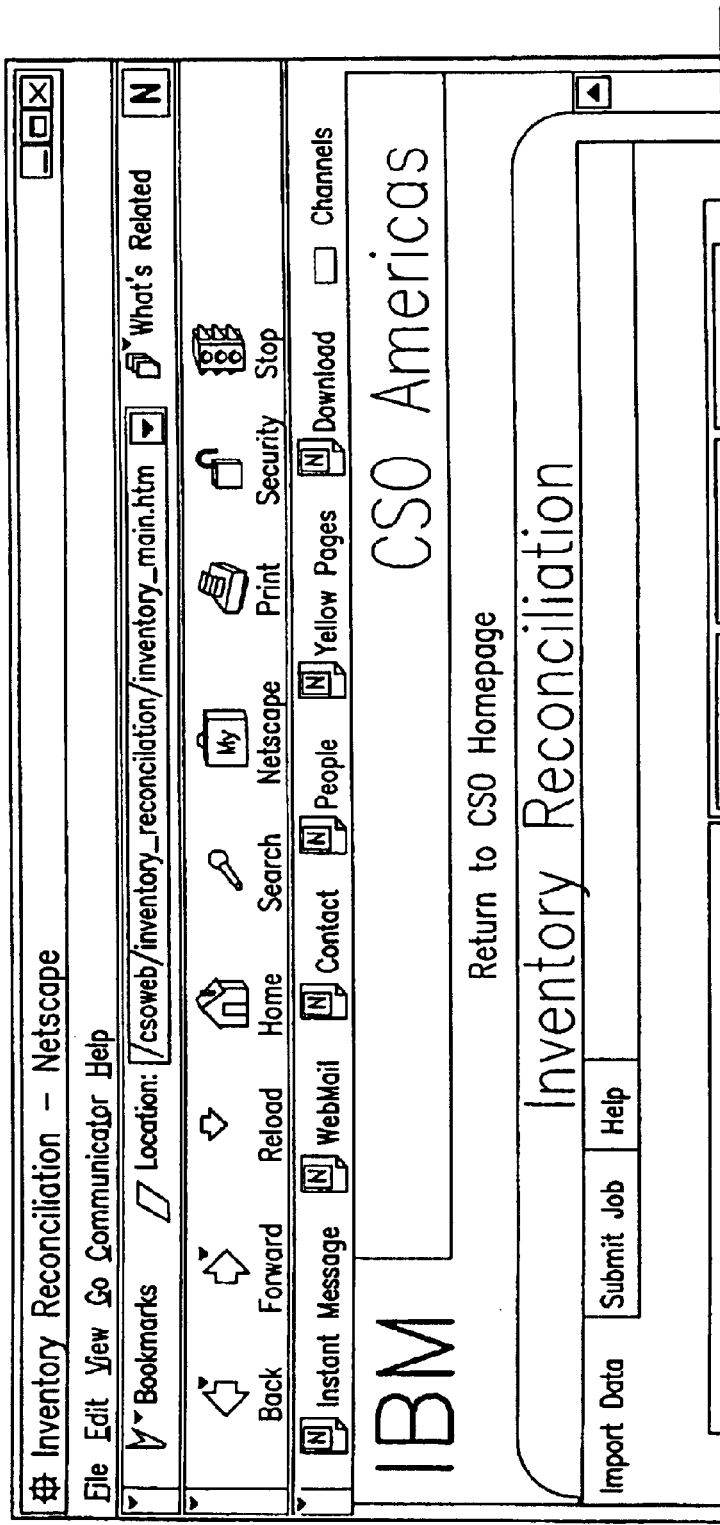

In the next step, the user preferably presses the "Set Machine Types" button 14. A "Define Type Field" dialog 15 pops up, as shown in FIG. 4. The user is given the option of selecting the field using the mouse 16, setting a single value for all fields 17, or setting the field as missing 18. In this case, the type information is in the file, so the user chooses the mouse method. At this point, the user can press the left mouse button at the top of the column, showing the types, and drags it so that the resulting rectangle encloses the four characters representing type. It is not necessary to drag the rectangle to the bottom of the data, the program will import the entire column. The utility then displays the selected type field in the right hand panel, as shown in FIG. 5.

Figures 6, 6A, 6B:
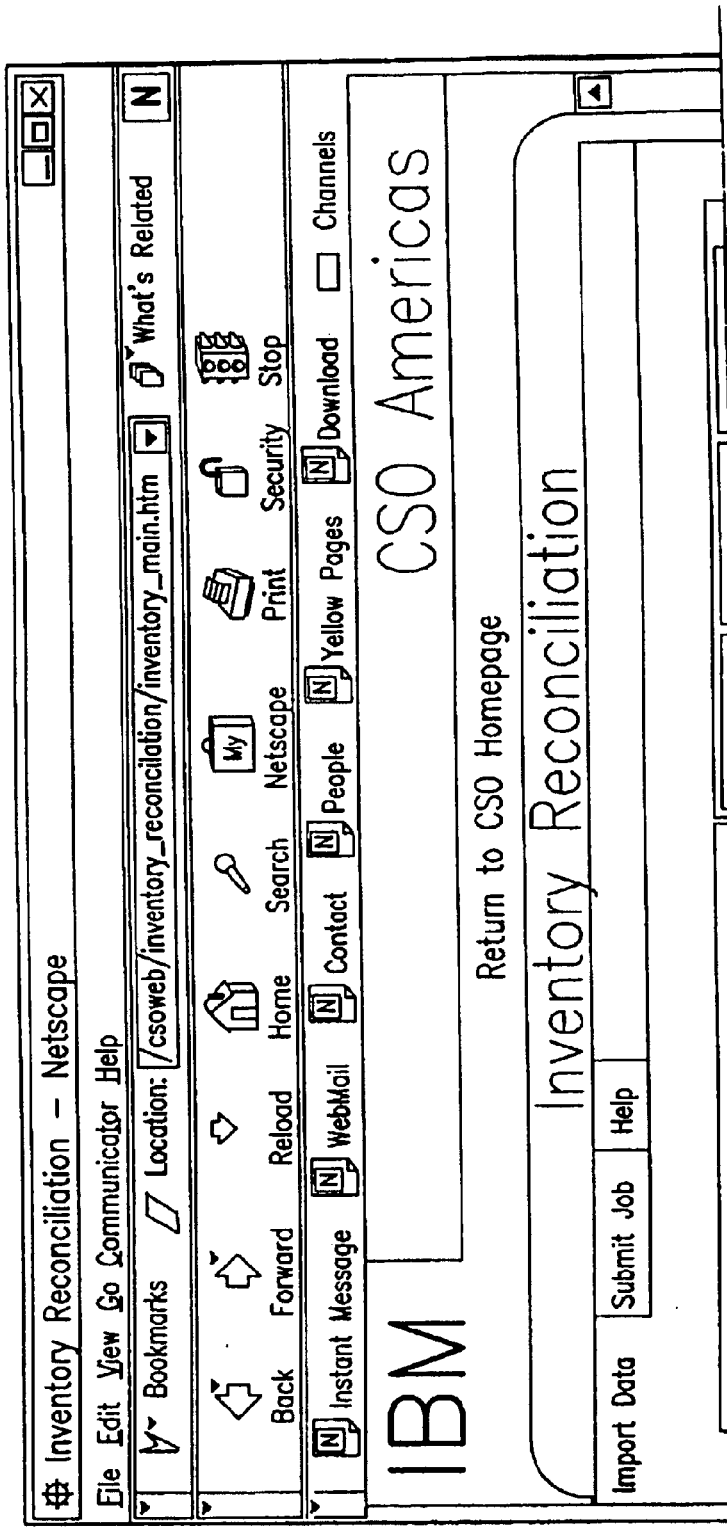
Figure 7:
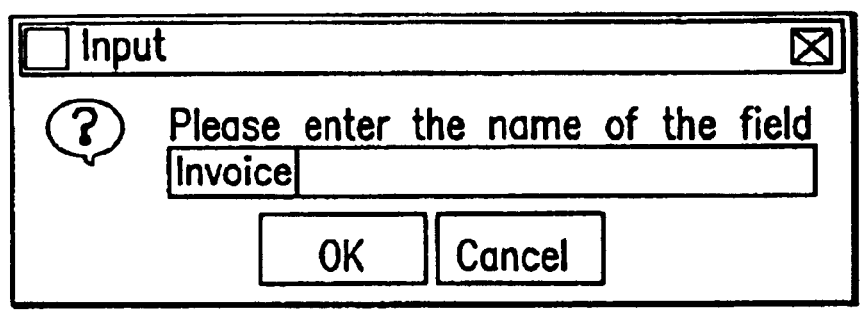
Figures 8, 8A, 8B:
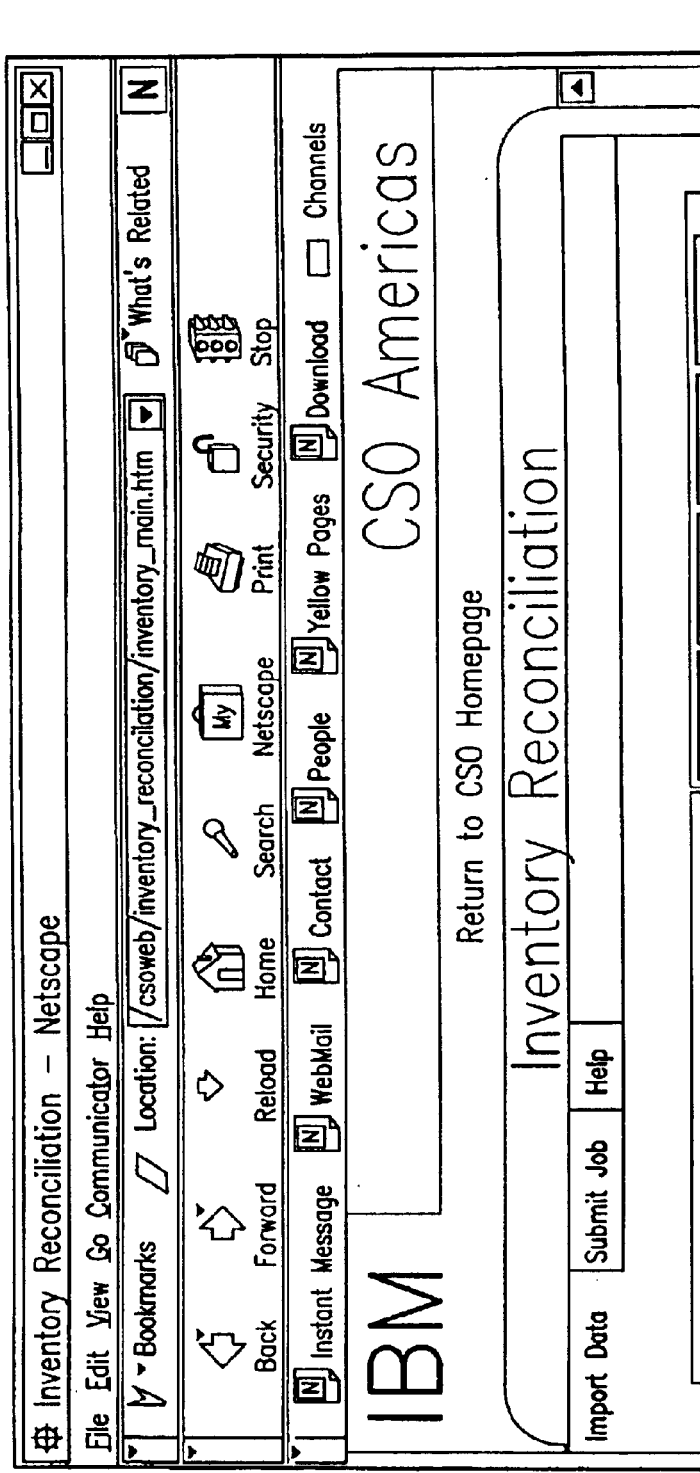
Figures 9, 9A, 9B:
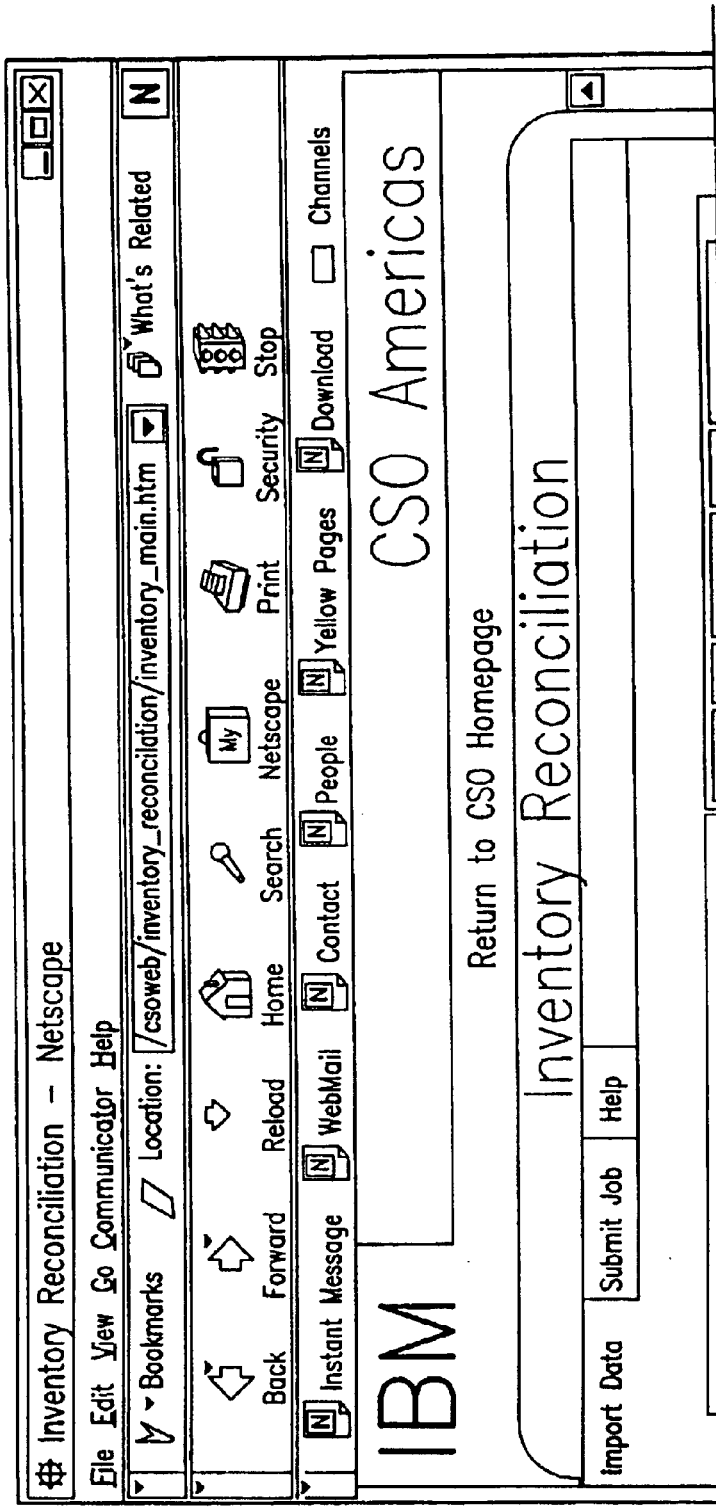

The same procedure may be used to import the model and serial number fields. FIG. 6 shows the three imported fields 19, 20, 21 in the right hand panel. This is sufficient data to upload to the inventory reconciliation application. Since output files showing the type, model, and serial number along with the maintenance status are returned to the customer, it is often useful for the customer to have more fields from the original data. They can include additional fields by pressing the "Add Field" button 22 shown in FIG. 6. A dialog, shown in FIG. 7, pops up prompting the user to enter the name of the new field. FIG. 8 shows the new field 23, "Invoice", added to the imported data. FIG. 9 is the final imported data showing the three required fields 19, 20, 21 and two additional fields 23, 24, including a second added field "Invoice Date" 24 added similar in the manner as discussed above for the "Invoice" field 23.

The imported data now is ready to be uploaded to the application which performs the inventory reconciliation. The data can be sent in ASCII, comma-delimited, format as shown in FIG. 10. The server application will know that the first column is type, the second model and the third serial number. Remaining fields are ignored, but show up in the output reconciliation files, which can be mailed to the customer.

Figure 11:
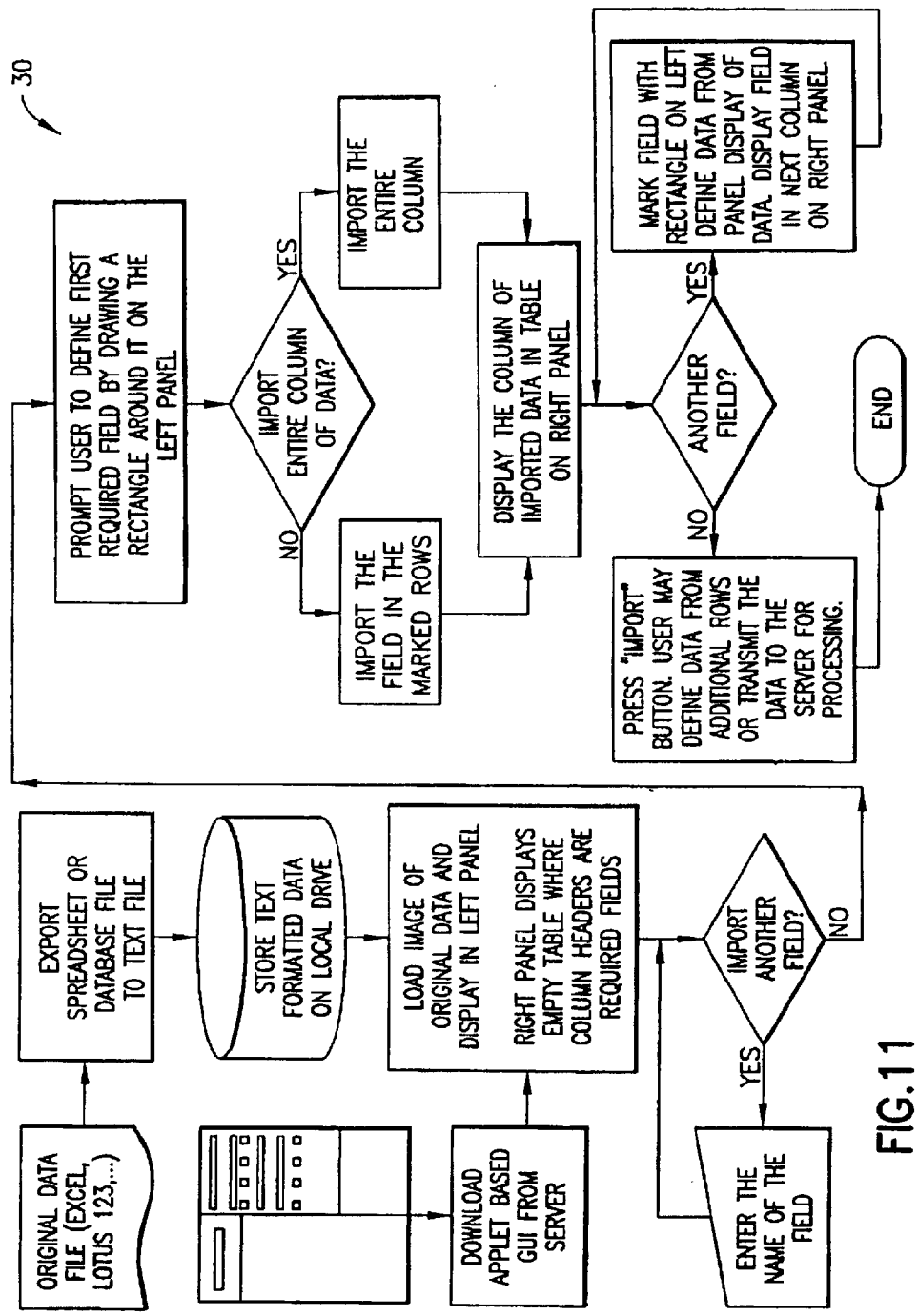
FIG. 11 provides a flow chart in overview of realization of the methodology of the present invention and as one way to enable the Example.

FIG. 11 provides a flow chart 30 for operational realization of the present invention.

What is claimed:

1. A computer method comprising:

providing an auxiliary Graphical User Interface (GUI) that allows a user to identify content included in an arbitrary data archival medium, said GUI including a first display window and a second display window on a same screen display;

exporting the content to a flat file;

importing the flat file content into said GUI, said GUI displaying at least a portion of said imported flat file in said first display window;

specifying with respect to the GUI a subset of GUI content for facilitating interrogation of the subset content; and displaying the resulting subset content in said second window.

wherein said specifying a subset of GUI content includes adding one or more new fields to the specified subset for the purpose of entering new content.

2. A method according to claim 1, wherein the identifying of content included in an arbitrary data archival medium correlates to at least 5% of total content that is included in the arbitrary data archival medium.

3. A method according to claim 1, wherein the archival medium comprises a spreadsheet.

4. A method according to claim 1, wherein the archival medium comprises a database table.

5. A method according to claim 1, wherein said exporting the content to a flat file comprises exporting the content to an ASCII file.

6. A method according to claim 1, wherein said exporting the content to a flat file comprises exporting the content to a flat file in which components of the content are delimited by at least one of blank, comma, tab, semicolon, and $ sign.

7. A method according to claim 1, wherein said exporting the content to a flat file comprises exporting content that correlates to at least 5% of the total data archival medium content.

8. A method according to claim 1, wherein the auxiliary GUI operates as a common interrogating tool for disparate data archival mediums.

9. A method according to claim 1, wherein said specifying a subset of GUI content comprises specifying a subset of the GUI content by using a mouse.

10. A method according to claim 1, wherein said specifying a subset of GUI content comprises specifying a subset of the GUI content by selecting a column defined by said GUI.

11. A method according to claim 1, wherein said specifying a subset of GUI content comprises specifying a subset of the GUI content by specifying a range of column values.

12. A computer system comprising:

means for identifying content included in an arbitrary data archival medium;

CPU means for exporting the content to a flat file;

CPU means for importing the flat file content into an auxiliary Graphical User Interface (GUI), said GUI including a first display window and a second display window on a same screen display, said GUI displaying at least a portion of said imported flat file on said first screen;

CPU means for specifying with respect to the GUI a subset of the GUI content for facilitating interrogation of the subset content;

means for displaying the resulting subset content in said second display window; and means for adding an additional field to said second display window, said additional field having an information content not present in said first data archive.

13. A programmable storage device comprising method steps for reconciling disparate data archival mediums, the method comprising:

identifying content included in an arbitrary data archival medium;

exporting the content to a flat file;

importing the flat file content into an auxiliary Graphical User Interface (GUI), said GUI including a first display window and a second display window on a same screen display, said GUI displaying at least a portion of said imported flat file on said first display window;

specifying with respect to the GUI a subset of the GUI content for facilitating interrogation of the subset content;

displaying the resulting subset content in said second display window; and adding an additional field to said second display window, said additional field having an information content not present in said first data archive.

14. A method of reconciling disparate data archival mediums, said method comprising:

identifying a content included in a first data archive;

exporting said identified content to a flat file;

importing said flat file content into an auxiliary Graphical User Interface (GUI), said GUI including two display windows on a same screen display, said GUI allowing at least a portion of said flat file content to be viewed in a first window of said two display windows, said GUI allowing a subset of said flat file content displayed in said first window to be selected as being a required field;

displaying at least a portion of said required field in a second display window of said two display windows; and adding an additional field to said second display window, said additional field having an information content not present in said first data archive.

15. The method of claim 14, further comprising:

exporting said required field into one of an application program and a second data archive.

16. A Graphical User Interface (GUI), comprising:

first display window;

a second display window on a same screen display as said first display window;

an importer to input a structured-content from a first data archive and load said structured-content as a flat-file content;

a display module to present at least a portion of said flat-file content in said first window;

a selector to allow a subset of said flat file content to be selected as being a required field said required field being displayed in said second window; and an input device for adding an additional field to said second display window, said additional field having an information content not present in said first data archive.

17. The GUI of claim 16, further comprising:

an exporter to output said required field into one of an application program and a second data archive.

18. The GUI of claim 16, wherein said GUI comprises an applet downloaded from a server.

* * * * *